(12) United States Patent
Noda et al.

(10) Patent No.: US 7,227,287 B2
(45) Date of Patent: Jun. 5, 2007

(54) MOTOR ASSEMBLY FOR VEHICLE AIR CONDITIONER

(75) Inventors: Takeo Noda, Shizuoka-ken (JP);
Akihiko Suzuki, Toyohashi (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 11/417,094

(22) Filed: May 3, 2006

(65) Prior Publication Data
US 2006/0192449 A1    Aug. 31, 2006

Related U.S. Application Data

(62) Division of application No. 10/875,399, filed on Jun. 23, 2004, now Pat. No. 7,067,946.

(30) Foreign Application Priority Data

Jun. 27, 2003  (JP)  ............................. 2003-184112
Jul. 7, 2003   (JP)  ............................. 2003-271368

(51) Int. Cl.
*H02K 11/00*   (2006.01)

(52) U.S. Cl. ..................... 310/68 R; 310/71
(58) Field of Classification Search .............. 310/68 R, 310/67 R, 52, 54, 64, 71
See application file for complete search history.

(56) References Cited

U.S. PATENT DOCUMENTS

| 6,107,708 A | 8/2000 | Yamaguchi et al. |
| 6,297,572 B1 * | 10/2001 | Sunaga et al. ............ 310/68 R |
| 6,333,576 B1 | 12/2001 | Ishikawa et al. |
| 6,528,919 B2 | 3/2003 | Fujii et al. |
| 6,831,435 B2 | 12/2004 | Suzuki |
| 2004/0263009 A1 | 12/2004 | Noda et al. |

FOREIGN PATENT DOCUMENTS

| EP | 1150017 | 10/2001 |
| JP | A-03-15247 | 2/1991 |
| JP | 05-130756 | 5/1993 |
| JP | 09117092 | 5/1997 |
| JP | 2000-316247 | 11/2000 |
| JP | A-2000-2-356200 | 12/2000 |
| JP | 2002-165401 | 6/2002 |

OTHER PUBLICATIONS

French Search Report for corresponding Application No. 655796.
Office Action, dated Jun. 9, 2006, for Chinese Patent Application No. 2004100498047, with English translation.

* cited by examiner

*Primary Examiner*—Darren Schuberg
*Assistant Examiner*—Nguyen Hanh
(74) *Attorney, Agent, or Firm*—Sheridan Ross P.C.

(57) ABSTRACT

A motor holder or a lower case defines therein a circuit accommodating chamber for accommodating a control circuit device. A side wall of the motor holder or the lower case that defines the circuit accommodating chamber has a vent for ventilating the chamber. A boundary section is formed between the motor holder and the lower case. An overhang extends from the motor holder. In a section of the circumference of the lower case, the overhang continuously covers the boundary section along the outer surface of the side wall of the lower case. A bulging portion is arranged to prevent water droplets from reaching the vent from the overhang. Therefore, the motor assembly prevents the integrally assembled control circuit device from being wet.

7 Claims, 3 Drawing Sheets

Fig. 4
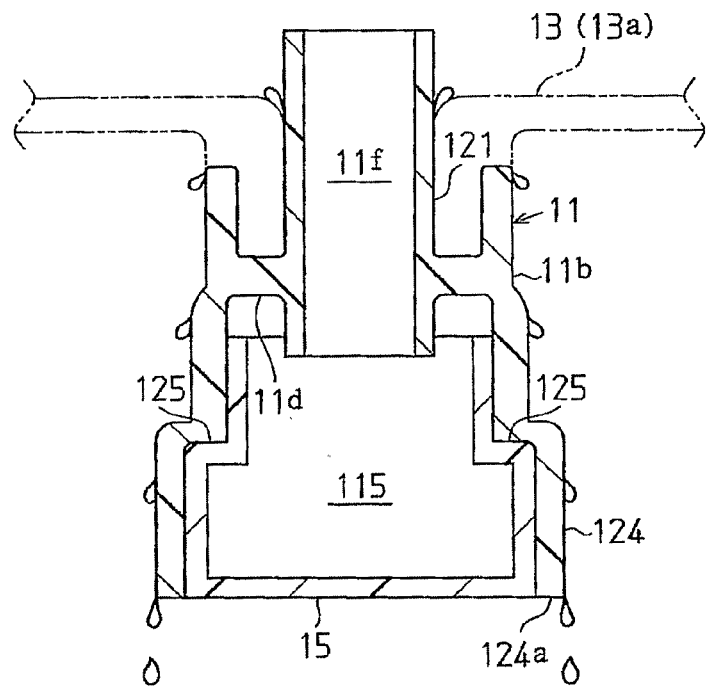
Fig. 5
Fig. 6
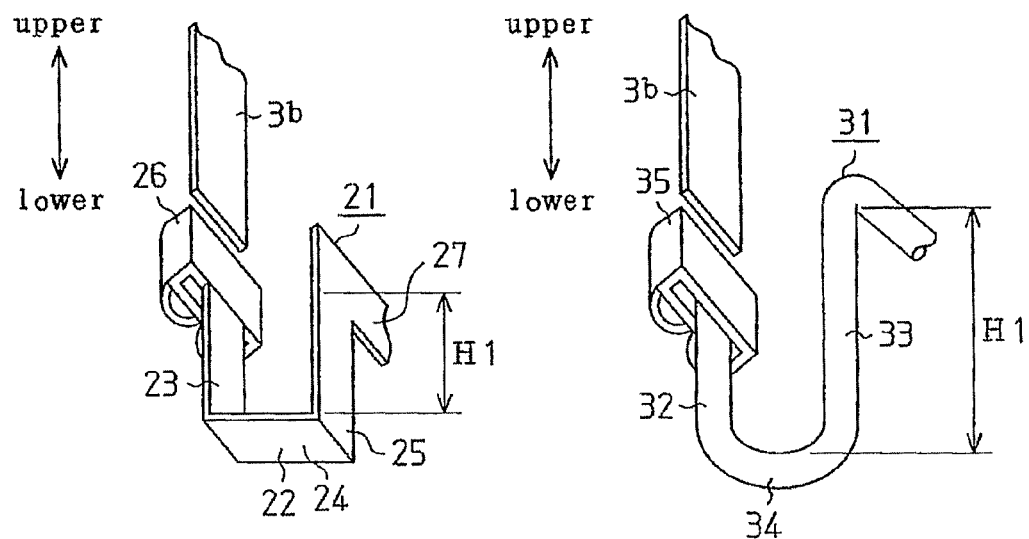

MOTOR ASSEMBLY FOR VEHICLE AIR CONDITIONER

RELATED APPLICATIONS

This application is a divisional of U.S. application Ser. No. 10/875,399, filed Jun. 23, 2004 now U.S. Pat. No. 7,067,946. This application also claims foreign priority benefits from Japanese Patent Application Serial No. 2003-184112, filed Jun. 27, 2003 and Japanese Patent Application Serial No. 2003-271368, filed Jul. 7, 2003.

BACKGROUND OF THE INVENTION

The present invention relates to a motor assembly for a vehicle air conditioner, which assembly includes a motor and a control circuit device integrally assembled with the motor. More particularly, the present invention pertains to a motor assembly for a vehicle air conditioner, which assembly has a structure that prevents a control circuit device from being wet.

For example, Japanese Patent No. 3157567 discloses a motor assembly for a vehicle air conditioner, which assembly includes a motor and a fan. The motor drives rotary shaft that protrudes upward. The fan is coupled to the rotary shaft. As the rotary shaft rotates, the fan causes air above to flow in radially outward directions. In such a motor assembly, the motor is located in an air conditioning chamber while being held by a motor holder. The motor assembly creates airflow in the air conditioning chamber with the fan, thereby drawing air outside or inside the vehicle and sending the air into the passenger compartment. The above described patent publication discloses a structure for preventing the interior of the motor from being wet.

On the other hand, to improve the passenger comfort, the rotation speed of the motor needs to be arbitrarily controlled. The rotation speed of the motor is controlled by a switching device such as a power transistor and a MOS field effect transistor (FET). When the motor rotation speed is controlled by using a switching device, a protection circuit for protecting the switching device needs to be provided to securely control the current (or voltage) of the motor assembly.

Japanese Laid-Open Patent Publication No. 2000-316247 discloses a motor assembly for a vehicle air conditioner, which assembly has a control circuit device and a fan. The assembly also includes a blower case attached to an upper side of a motor holder, and a lower case attached to a lower side of the motor holder. A waterproof structure of the motor assembly is constructed by providing a notch in a boundary section between the motor holder and the lower case. If air that has been drawn into the motor assembly contains water, some of the water advances along the gap between the motor holder and the lower case, and is then guided to the outside of the motor assembly through the notch formed in the boundary section. As a result, the control circuit device is prevented from being wet with water that enters inside the motor assembly.

However, in the motor assembly disclosed in the publication No. 2000-316247, the notch in the boundary section produces a hole. Therefore, if water fails to be guided to the outside of the assembly through the notch, the water can enter the interior of the motor and cause the control circuit device to be wet. Further, water that exits the assembly through the boundary section can flow along the outer surface of the motor holder or the lower case, and enter the motor through the hole, causing the control circuit device to be wet.

Further, water that exits the assembly through the boundary section between the blower case and the motor holder can flow along the outer surface of the motor holder, and enter the interior through the boundary section between the motor holder and the lower case, causing the control circuit device to be wet.

The motor is located in a position that communicates with an outside air inlet. Thus, when the vehicle is washed in a car wash and water is applied to the outside air inlet with a high pressure, the water can enter the outside air inlet. This causes connecting members such as wires that electrically connect the control circuit device with the motor to be wet with water droplets. Further, in some cases condensation occurs due to the difference between the temperature of the passenger compartment and the outside temperature, which can result in water droplets collected on the connecting members. The water droplets on the connecting members can then flow along the members and reach the control circuit device.

SUMMARY OF THE INVENTION

Accordingly, it is an objective of the present invention to provide a motor assembly for a vehicle air conditioner, which assembly prevents an integrally assembled control circuit device from being wet.

To achieve the above objective, the present invention provides a motor assembly for a vehicle air conditioner. The motor assembly includes a motor having a rotary shaft, a control circuit device that controls the motor to rotate, a fan fixed to the rotary shaft, a motor holder for accommodating the motor, a lower case attached to the motor holder. The motor holder or the lower case defines therein a circuit accommodating chamber for accommodating the control circuit device. A side wall of the motor holder or the lower case that defines the circuit accommodating chamber has a vent for ventilating the circuit accommodating chamber. A boundary section is formed between the motor holder and the lower case. An overhang extends from the motor holder. The overhang is integrally formed with the motor holder. The overhang faces an outer surface of the side wall of the lower case. In a section of the circumference of the lower case, the overhang continuously covers the boundary section along the outer surface of the side wall of the lower case. A bulging portion projects from the overhang in a direction away from the motor holder. The bulging portion is arranged to prevent water droplets from reaching the vent from the overhang.

According to another aspect of the invention, a motor assembly for a vehicle air conditioner is provided. The motor assembly includes a motor having a rotary shaft, a control circuit device that controls the motor to rotate, a fan fixed to the rotary shaft. When rotates, the fan draws air outside or inside the vehicle and sends the air into the passenger compartment. The motor assembly further includes a motor holder for accommodating the motor, a motor terminal extending from the motor and a connecting member for electrically connecting the motor terminal with the control circuit device. The motor terminal and the connecting member form an electric path from the motor to the control circuit device. An upward extension is provided in part of the connecting member in the electrical path that is close to the control circuit device. The upward extension extends upward with respect to a direction from the motor toward the control circuit device along the electric path.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a cross-sectional view taken along line IV—IV in FIG. 1;

FIG. 5 is a perspective view illustrating part of the motor assembly of FIG. 1; and FIG. 6 is a perspective view illustrating part of a motor assembly according to another embodiment of the present invention.

DETAILED DESCRIPTION OF THE PREFERRED EMBODIMENTS

One embodiment of the present invention will now be described with reference to the drawings.

Figure 1:
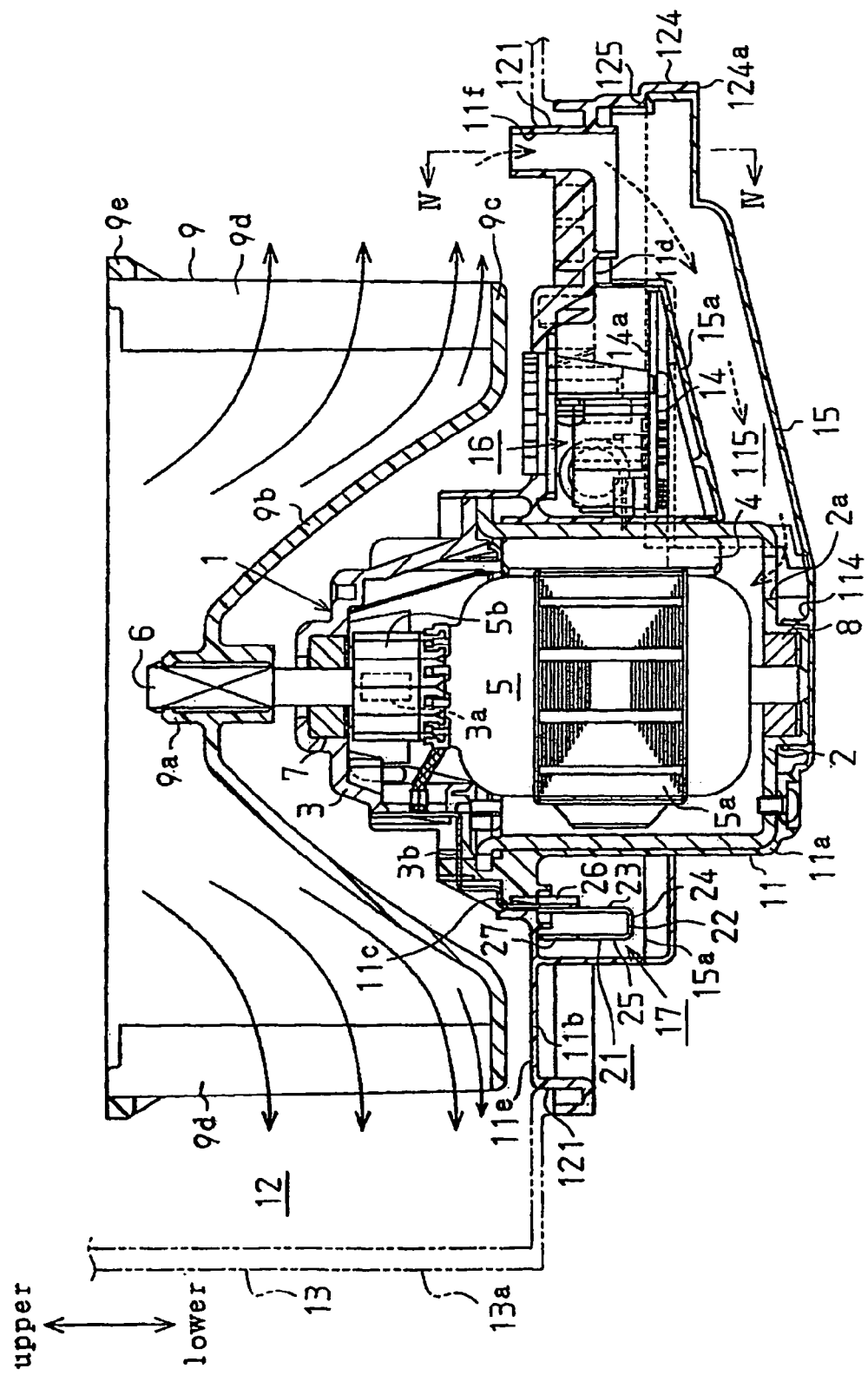
FIG. 1 is a cross-sectional view taken along line I-O-I of FIG. 2, illustrating a motor assembly for a vehicle air conditioner according to one embodiment of the present invention.

As shown in FIG. 1, a motor 1 of a motor assembly for a vehicle air conditioner is a direct-current motor. The motor 1 includes a substantially cylindrical yoke 2, a brush holder 3, magnets 4 and an armature 5. The brush holder 3 covers an open end (upper end as viewed in FIG. 1) of the yoke 2 and holds brushes 3a. The magnets 4 are secured to the inner circumferential surface of the yoke 2. The armature 5 is substantially accommodated in the yoke 2. A rotary shaft 6 of the armature 5 is rotatably supported with a bearing 7 fixed to the brush holder 3 and with a bearing 8 fixed to the yoke 2 such that one end of the rotary shaft 6 protrudes upward from the brush holder 3. The motor 1 is arranged in the vehicle such that the axial direction of the rotary shaft 6 is substantially vertical.

The armature 5, which is located inside the magnets 4, has a core 5a and a commutator 5b. The core 5a is fixed to a section of the rotary shaft 6 that is slightly below the middle of the rotary shaft 6. The commutator 5b is fixed to the section of the rotary shaft 6 that is slightly above the middle of the rotary shaft 6. The brushes 3a held by the brush holder 3 slide on the commutator 5b. A fan 9 is coupled to the upper end of the rotary shaft 6 to rotate integrally with the rotary shaft 6. When the rotary shaft 6 rotates, the fan 9 flows air above in radially outward directions. The fan 9 includes a boss 9a, a bell-shaped portion 9b, an annular portion 9c, blades 9d, and a coupling portion 9e. The rotary shaft 6 is fitted in the boss 9a. The bell-shaped portion 9b extends from the boss 9a to cover the upper sides of the brush holder 3 and the yoke 2. The annular portion 9c further extends radially outward from the periphery of the bell-shaped portion 9b. The blades 9d (only two of which are shown in FIG. 1) are arranged along the circumferential direction of the boss 9a such that the upper end of each blade 9d is coupled to the annular coupling portion 9e and the lower end of each blade 9d is coupled to the annular portion 9c. When the rotary shaft 6 rotates, the fan 9 causes air above to flow in radially outward direction with the blades 9d (see solid arrows in FIG. 1).

Figure 2:
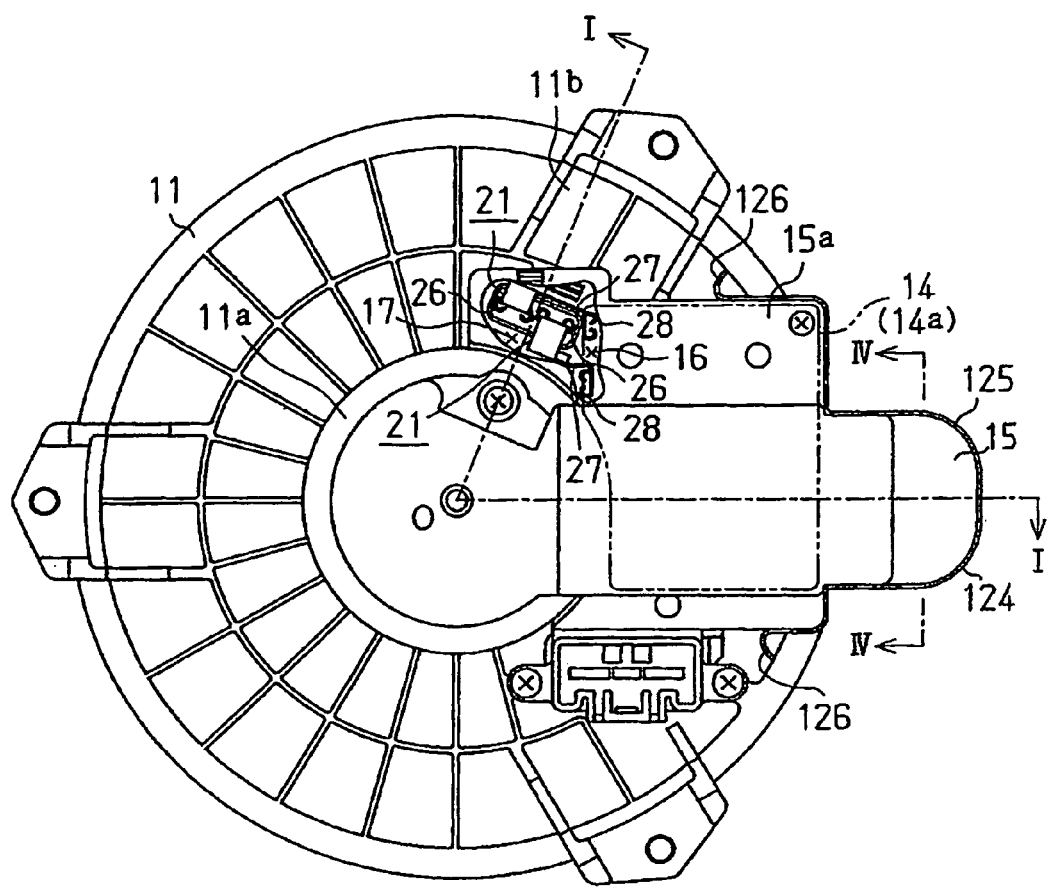
FIG. 2 is a bottom view illustrating the motor assembly of FIG. 1.

The motor 1 is held by a synthetic resin motor holder 11 and is located in an air conditioning chamber 12. As shown in FIGS. 1 and 2, the motor holder 11 includes a holding cylinder 11a and a disk-shaped flange 11b. The holding cylinder 11a is substantially shaped as a cylinder with a bottom wall. The flange 11b extends radially outward from an axially central portion of the holding cylinder 11a. The motor 1 (the yoke 2) is inserted in and held by the holding cylinder 11a. The flat surface of the annular portion 9c of the fan 9 faces the flange 11b. An air conditioning chamber member (blower case) 13, which is shown with two-dot chain line in FIG. 1, is fixed to the motor holder 11. The air conditioning chamber member 13 has a circumferential wall 13a. A suction port (not shown) is formed in an upper section of the circumferential wall 13a. The suction port communicates with an outside air inlet and an inside air inlet (not shown). Also, a discharge port (not shown) is formed in a radially outer part of the circumferential wall 13a. A space surrounded by the air conditioning chamber member 13 and the flange 11b is the air conditioning chamber 12.

A circuit board 14a is fixed to a lower surface 11d of the flange 11b with, for example, screws. A number of elements that form a control circuit device 14 are mounted to the circuit board 14a. When excitation current is supplied to the armature 5 from the control circuit device 14 through the brushes 3a, the armature 5 is rotated. Accordingly, the rotary shaft 6 is rotated. The control circuit device 14 controls the rotation speed of the rotary shaft 6. Therefore, when excitation current is supplied to the armature 5, the fan 9 is rotated together with the rotary shaft 6. Accordingly, air outside or inside the vehicle is drawn and sent to the passenger compartment.

A through hole 2a is formed in the bottom of the yoke 2. The through hole 2a connects the interior of the yoke 2 with the outside. The through hole 2a communicates with a communication passage 114 that is defined between the bottom of the holding cylinder 11a of the motor holder 11 and the bottom of the yoke 2.

A lower case 15 is fixed to the lower surface 11d of the flange 11b of the motor holder 11 with, for example, screws. The lower case 15 and the motor holder 11 defines an air duct 115 for guiding some of the brown air created by the fan 9 to the interior of the motor 1 (the interior of the yoke 2) to cool the motor 1 (see arrows of broken lines in FIG. 1). The lower case 15 accommodates the control circuit device 14. The lower case 15 is made of the same synthetic resin as the motor holder 11. The air duct 115 is connected to the through hole 2a through the communication passage 114. The air duct 115 is also connected to an introduction hole 11f formed in a radially projecting portion of the flange 11b.

A partitioning wall 15a is located in the lower case 15. The partitioning wall 15a is integrally formed with the lower case 15 to separate the air duct 115 and the control circuit device 14 from each other. The partitioning wall 15a divides the interior of the lower case 15 so that a circuit accommodating chamber 16 is defined between the motor holder 11 and the partitioning wall 15a. The control circuit device 14 is accommodated in the circuit accommodating chamber 16. The circuit accommodating chamber 16 does not need to be defined in the lower case 15, but may be defined in the motor holder 11.

The circumferential wall 13a of the air conditioning chamber member 13, which surrounds the fan 9, is attached to the upper surface 11e of the flange 11b. A boundary section 121 between the flange 11b and the circumferential wall 13a has a small gap.

As shown in FIGS. 1, 2 and 4, a boundary section 125 is defined between the flange 11b of the motor holder 11 and the lower case 15. As shown in FIGS. 1 to 4, an overhang 124 is integrally formed with the flange 11b to extend further downward than the boundary section 125. The overhang 124 covers the outer surface of the side wall of the lower case 15. The overhang 124 extends as far as the lower end of the side wall of the lower case 15. That is, the lower end 124a of the overhang 124 reaches the lower end of the side wall of the lower case 15. The overhang 124 may extend further downward than the lower end of the side wall of the lower case 15. The boundary section 125 has a small gap so that the flange 11b and the lower case 15 do not closely contact each other. The overhang 124 continuously covers the gap of the boundary section 125 from the outside of the lower case 15. That is, the overhang 124 is bent to extend in a direction perpendicular to the rotary shaft 6 of the motor 1, that is, horizontally to surround the air duct 115 (particularly refer to FIGS. 2 and 4). In other words, the overhang 124 surrounds part of the lower case 15 that surrounds the air duct 115. The longitudinal direction of the overhang 124 is the direction perpendicular to the rotary shaft 6.

Figure 3:
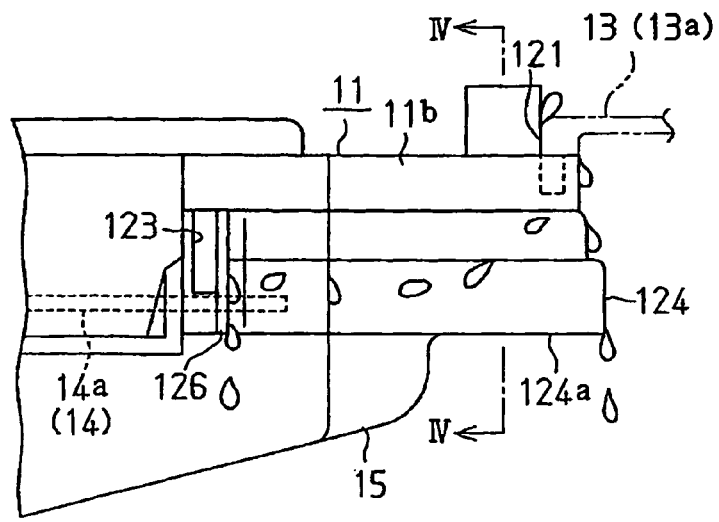
FIG. 3 is an enlarged view illustrating an overhang and a bent portion of the motor assembly shown in FIG. 1.

As shown in FIG. 3, a vent 123 is formed in each side wall in the lower case 15 that defines the circuit accommodating chamber 16. The vents 123 (only one is shown in FIG. 3) are used to dissipate heat generated by the control circuit device 14. As shown in FIGS. 2 and 3, a bulging portion, which is a curved portion 126 bent outward away from the lower case 15, is formed in each horizontal end of the overhang 124, or in each end of the overhang 124 in a direction perpendicular to the rotary shaft 6 of the motor 1. That is, each curved portion 126 is located at an end of the overhang 124 that is adjacent to the vent 123. Each curved portion 126 is arranged such that the corresponding vent 123 is at least partly exposed to the outside. In this embodiment, each curved portion 126 is arranged along the periphery of the corresponding vent 123. As long as the vents 123 each is formed in a side wall that defines the circuit accommodating chamber 16, the vents 123 do not need to be formed in the side wall of the lower case 15, but may be formed in the side wall of the motor holder 11.

In the motor assembly for a vehicle air conditioner as constructed above, when the motor 1 rotates in response to an operation of the control circuit device 14, the fan 9 rotates to blow air as shown in FIG. 1. Some of the airflow created by the rotation of the fan 9 flows into the introduction hole 11f as a coolant air (indicated by arrows in FIG. 1). This portion of the airflow passes through the air duct 115, the communication passage 114, and the communication hole 2a of the yoke 2 and reaches the interior of the motor 1. Thereafter, the airflow is discharged through an opening between the yoke 2 of the motor 1 and the brush holder 3. While passing through the interior of the motor 1, the airflow cools the interior of the motor 1. Specifically, the airflow cools the components of the motor 1, such as the coil of the armature 5, the brushes 3a, and the commutator 5b.

The boundary section 121 between the flange 11b and the circumferential wall 13a has the small gap so that the flange 11b and the circumferential wall 13a do not closely contact each other. Therefore, if the fan 9 draws moisture and droplets (rain, snow) contained in the outside air into the air conditioning chamber 12, some of the drawn water enters the boundary section 121. The water then flows along the boundary section 121 and oozes to the outer surface of the motor assembly through the boundary section 121. Since the overhang 124 is provided at a section of the motor holder 11 in which the water oozes through the boundary section 121, the oozed water flows downward along the outer surface of the overhang 124 and drips from the lower end 124a of the overhang 124.

The motor assembly can be inclined depending on the state of operation. In such a case, water that has oozed to the outer surface of the motor assembly through the boundary section 121 can reach the curved portions 126 after flowing in the longitudinal direction along the overhang 124, or flowing from right to left in the FIG. 3. After reaching any of the curved portions 126, the water is guided by the curved portion 126 and drips.

As shown in FIGS. 1 and 2, the motor 1 is electrically connected to the control circuit device 14 with connecting members, which are two intermediate terminals 21. Each intermediate terminal 21 electrically connects the corresponding motor terminal 3b extending from the motor 1 to the control circuit device 14. That is, the motor terminal 3b and the intermediate terminal 21 form an electric path from the motor 1 to the control circuit device 14. Each intermediate terminal 21 is formed by punching a metal plate with a pressing machine, and bending the pressed plate with a pressing machine. Each intermediate terminal 21 is accommodated in a connecting member accommodating chamber, which is a terminal accommodating chamber 17 defined between the motor holder 11 and part of the lower case 15. The terminal accommodating chamber 17 is adjacent to the circuit accommodating chamber 16 with a partition wall (not shown) in between. That is, the terminal accommodating chamber 17 is isolated from the circuit accommodating chamber 16. The intermediate terminal 21 is provided on the flange 11b, and the motor terminal 3b extends from the motor 1 toward the flange 11b.

As shown in FIGS. 1 and 5, the intermediate terminal 21 includes a bent portion 22, which has a U-shaped section. The bent portion 22 includes a downward extension 23, a bottom portion 24, and an upward extension 25. The downward extension 23, the bottom portion 24, and the upward extension 25 are each formed rectangular. The upper end of the downward extension 23 is bent so that a terminal receiving portion 26 is formed. One end of the motor terminal 3b (lower end) is fitted in the terminal receiving portion 26. The other end (upper end) of the motor terminal 3b extends through a through hole 11c formed in the flange 11b toward the brush holder 3, and is electrically connected to the brush 3a.

In the electric path, the downward extension 23 is provided in a portion of the intermediate terminal 21 that is closer to the motor terminal 3b. The downward extension 23 extends downward with respect to the direction from the motor 1 toward the control circuit device 14 along the electric path. The downward extension 23 extends from the terminal receiving portion 26 along the axis of the rotary shaft 6, that is, extends vertically.

The bottom portion 24 is bent from the lower end of the downward extension 23 at a right angle and extends horizontally. The upward extension 25 extends from the distal end of the bottom portion 24 upward along the axis of the rotary shaft 6. That is, in the electric path, the upward extension 25 is provided in a portion of the intermediate terminal 21 that is closer to the control circuit device 14. The upward extension 25 extends upward with respect to the direction from the motor 1 toward the control circuit device 14 along the electric path. The widths of the downward extension 23, the bottom portion 24, and the upward extension 25 are substantially the same.

From an edge of an upper portion of the upward extension 25, a side extension 27 extends along the width of the upward extension 25 at a right angle with respect to the edge. The length from the lower end to the upper end of the upward extension 25, that is, the length (height) H1 from the bottom portion 24 to the lower end of the side extension 27, is determined such that even if water droplets collect on the bottom portion 24 and move upward due to surface tension, the water droplets do not reach the lower end of the side extension 27. As shown in FIG. 2, the side extension 27 extends from the upward extension 25 toward the control circuit device 14. The side extension 27 is electrically connected to the circuit board 14a (the control circuit device 14) with an engaging portion 28 formed at the distal end of the side extension 27.

When the vehicle is washed in a car wash and rush of water is applied to the vehicle and when condensation occurs due to the difference between the temperature of the passenger compartment and the outside temperature, water droplets collect on the inner surface of the air conditioning chamber member 13 and the upper surface 11e of the flange 11b. Water droplets also collect on the motor terminal 3b, which is exposed in the upper surface 11e of the flange 11b. In other words, the motor terminal 3b is located at a position where water droplet collect. Therefore, water droplets may enter the through hole 11c along the motor terminal 3b and reaches the intermediate terminal 21. Since the intermediate terminal 21 of this embodiment has the upward extension 25, which extends upward in a direction from the motor 1 toward the control circuit device 14, the droplets are prevented moving upward along the upward extension 25. Thus, the droplets are prevented from moving along the intermediate terminal 21 and reaching the control circuit device 14. That is, the control circuit device 14 is prevented from being wet.

Further, the downward extension 23 and the bottom portion 24 are located in a section preceding the upward extension 25 with respect to the direction from the motor 1 toward the control circuit device 14. Thus, water droplets that have moved to the downward extension 23 from the motor terminal 3b drop off the lower end of the downward extension 23 and the bottom portion 24. Therefore, water droplets hardly reach the upward extension 25, which further effectively prevents droplets from reaching the control circuit device 14.

This embodiment provides the following advantages.

(1) The overhang 124 extends from the flange 11b of the motor holder 11 to cover the gap of the boundary section 125 between the motor holder 11 and the lower case 15. As a result, water that has oozed to the outer surface of the motor assembly through the boundary section 121 between the flange 11b and the circumferential wall 13a dribbles along the overhang 124. Therefore, since water hardly enters the interior of the motor assembly through the boundary section 125 between the motor holder 11 and the lower case 15, water is prevented from entering the circuit accommodating chamber 16. The control circuit device 14 is therefore prevented from being wet.

(2) The curved portions 126 are formed on the overhang 124. When water that moves along the overhang 124 reaches either curved portion 126, the water dribbles along the curved portion 126. As a result, water is prevented from entering the circuit accommodating chamber 16 through the vent 123 formed in the side wall of the lower case 15. Therefore, even if water moves on the overhang 124 along the longitudinal direction of the overhang 124, for example, when the motor assembly is used while being inclined, the control circuit device 14 is prevented from being wet.

(3) The partitioning wall 15a is located in the lower case 15 to separate the air duct 115 and the circuit accommodating chamber 16 from each other. As a result, even if the outside air that is drawn inside the motor assembly contains moisture or water (rain, snow), the outside air is prevented from entering the circuit accommodating chamber 16 by the partitioning wall 15a when passing through the air duct 115. Therefore, the control circuit device 14 is not exposed to air flow containing water, and is prevented from being wet.

(4) The configuration of the above embodiment is simple in which only the overhang 124 having the curved portions 126 is provided to cover the boundary section 125 between the motor holder 11 and the lower case 15. This facilitates the manufacturing and does not increase the costs.

(5) Since the motor holder 11 and the overhang 124 are integrated, no sealing member is needed to be provided at the boundary section 125 between the motor holder 11 and the lower case 15 to prevent water from entering the assembly. As a result, no extra cost is required.

(6) The overhang 124 only covers a portion of the lower case 15 that are likely to be wet. This configuration prevents unnecessary increase of the weight. Further, the vent 123 formed in the side wall of the circuit accommodating chamber 16 is not blocked. The vent 123 is thus not hindered from dissipating heat of the control circuit device 14.

(7) The motor terminal 3b is located at a position where water droplets are likely to collect. In a section of the intermediate terminal 21 that is close to the control circuit device 14, the upward extension 25, which extends upward with respect to the direction from the motor 1 toward the control circuit device 14, is provided to prevent water droplets from moving from the motor terminal 3b toward the control circuit device 14 (the circuit board 14a). Thus, even if water droplets collect on the intermediate terminal 21, the water droplets are prevented from moving upward along the intermediate terminal 21 and reaching the control circuit device 14. Therefore, the control circuit device 14 is prevented from being wet, which improves the reliability of the control circuit device 14.

(8) The downward extension 23 is provided in a portion of the intermediate terminal 21 that is closer to the motor terminal 3b. The downward extension 23 extends downward with respect to the direction from the motor 1 toward the control circuit device 14. Thus, water droplets that have moved from the motor terminal 3b drop off the lower end of the downward extension 23 and the bottom portion 24 between the downward extension 23 and the upward extension 25. Therefore, water droplets hardly reach the upward extension 25, which further effectively prevents droplets from reaching the control circuit device 14. Further, since the downward extension 23 and the upward extension 25 form the bent portion 22 in the intermediate terminal 21, vibration of the motor 1 transmitted from the motor terminal 3b is attenuated by the bent portion 22 and is not transmitted to the control circuit device 14. Accordingly, the noise of the motor assembly for the vehicle air conditioner is reduced, and the reliability of the control circuit device 14 is improved.

(9) The length H1 from the lower end to the upper end of the upward extension 25 of the intermediate terminal 21, that is, the length from the bottom of the upward extension 25 to the lower end of the side extension 27, is determined such that even if water droplets move upward due to surface tension, the droplets do not reach the lower end of the side extension 27. Therefore, water droplets are further effectively prevented from moving upward along the upward extension 25 and reaching the control circuit device 14.

(10) The upward extension 25 of the intermediate terminal 21 is formed along the axis of the rotary shaft 6 such that the upward extension 25 extends along the vertical direction when the motor assembly is mounted to the vehicle. Therefore, water droplets are further effectively prevented from moving upward along the upward extension 25 and reaching the control circuit device 14.

(11) The downward extension 23 of the intermediate terminal 21 is formed along the axis of the rotary shaft 6 such that the downward extension 23 extends along the vertical direction when the motor assembly is mounted to the vehicle. Then, droplets more easily drop off the lower end of the downward extension 23. Therefore, water droplets hardly reach the upward extension 25, which further effectively prevents droplets from reaching the control circuit device 14.

(12) Since the circuit accommodating chamber 16 and the terminal accommodating chamber 17 are defined, water droplets on the intermediate terminal 21 are prevented from collecting on the terminal accommodating chamber 17, and water droplets on the terminal accommodating chamber 17 are prevented from collecting on the circuit accommodating chamber 16. Therefore, the control circuit device 14 is further effectively prevented from being wet.

(13) If the specifications of the motor 1 is modified (the shape is modified), the motor 1 can be connected to the control circuit device 14 only by changing the shape of the intermediate terminal 21, and the shape of the control circuit device 14 does not need to be modified. Therefore, even if the specification of the motor 1 is modified, the same control circuit device 14 can be used. This reduces the costs of the control circuit device 14.

The invention may be embodied in the following forms.

In the illustrated embodiment, the bulging portions for preventing water from entering the circuit accommodating chamber 16 from the vent 123 formed in the side wall of the circuit accommodating chamber 16 comprise the curved portions 126 formed by bending the ends of the overhang 124. However, the bulging portions may be formed on the overhang 124 by molding.

In the illustrated embodiment, the partitioning wall 15a is integrally formed with the lower case 15. However, the partitioning wall 15a may be separately formed from the lower case 15. Alternatively, the partitioning wall 15a may be integrally formed with the motor holder 11. If the partitioning wall 15a is integrally formed with the lower case 15 or the motor holder 11, the number of the components is reduced, and the load of the assembly is reduced.

The upward extension 25 does not need to extend along the axis of the rotary shaft 6, but may be extend slantly upward with respect to the axis of the rotary shaft 6. That is, the orientation of the upward extension 25 may be varied as long as the distal end of the upward extension 25 heads upward than the proximal end of the upward extension 25, which is connected to the bottom portion 24, when the motor assembly is mounted to the vehicle.

In the illustrated embodiment, the intermediate terminal 21 includes the downward extension 23, the bottom portion 24, and the upward extension 25. This configuration may be changed as long as the intermediate terminal 21 at least has the upward extension 25. The bottom portion 24 may be omitted, and at least one of the upward extension 25 and the downward extension 23 may be inclined. The upward extension 25 does not need to be shaped a flat plate.

In the illustrated embodiment, the intermediate terminal 21 is used as a connecting member. However, as shown in FIG. 6, a connecting wire 31 may be used as a connecting member. The connecting wire 31 has a bent portion 34. The bent portion 34 is substantially shaped as the letter U and includes a downward extension 32 and an upward extension 33. The downward extension 32 extends downward with respect to the motor terminal 3b, and the upward extension 33 extends upward form the lower end of the downward extension 32. A terminal receiving member 35 is attached to the upper end of the downward extension 32. The motor terminal 3b is fitted in the terminal receiving member 35.

In the above illustrated embodiment, the accommodating chamber 16 for accommodating the control circuit device 14 and the terminal accommodating chamber 17 for accommodating the intermediate terminal 21 are defined. However, the circuit accommodating chamber 16 and the terminal accommodating chamber 17 need not be defined.

In the illustrated embodiment, the motor 1 is mounted to the vehicle such that the axial direction of the rotary shaft 6 is vertical. However, the motor 1 may be mounted to the vehicle such that the axial direction of the rotary shaft 6 is slightly inclined with respect to the vertical direction.

In the illustrated embodiment, the motor 1 has the brushes 3a. However, the present invention may be applied to a brushless motor. In this case also, the same advantages as listed above are provided.

The present examples and embodiments are to be considered as illustrative and not restrictive and the invention is not to be limited to the details given herein, but may be modified within the scope and equivalence of the appended claims.

The invention claimed is:

1. A motor assembly for a vehicle air conditioner, comprising:
    a motor having a rotary shaft;
    a control circuit device that controls the motor to rotate;
    a fan fixed to the rotary shaft, wherein, when rotates, the fan draws air outside or inside the vehicle and sends the air into the passenger compartment;
    a motor holder for accommodating the motor;
    a motor terminal extending from the motor; and
    a connecting member for electrically connecting the motor terminal with the control circuit device, the motor terminal and the connecting member forming an electric path from the motor to the control circuit device, wherein an upward extension is provided in part of the connecting member in the electrical path that is close to the control circuit device, the upward extension extending upward with respect to a direction from the motor toward the control circuit device along the electric path,
    wherein the motor includes magnets and coils to rotate the rotary shaft, the coils being electrically connected to the motor terminal,
    wherein the motor holder includes a holding cylinder and a flange, the motor being inserted in and held by the holding cylinder, the holding cylinder accommodating the magnets and the coils, the flange extending radially outward from the holding cylinder, wherein the connecting member is provided on the flange, and the motor terminal extends from the motor toward the flange.

2. The motor assembly according to claim 1, wherein, when the motor assembly is mounted to the vehicle, the upward extension extends substantially vertically.

3. The motor assembly according to claim 1, wherein a downward extension is provided in part of the connecting member in the electric path that is close to the motor terminal, the downward extension extending downward with respect to a direction from the motor toward the control circuit device along the electric path.

4. The motor assembly according to claim 3, wherein, when the motor assembly is mounted to the vehicle, the downward extension extends substantially vertically.

5. The motor assembly according to claim 1, wherein the length of the upward extension is determined such that if water droplets on the lower end of the upward extension move upward along the upward extension due to surface tension, the water droplets do not reach the upper end of the upward extension.

6. The motor assembly according to claim 1, wherein the motor holder defines a circuit accommodating chamber for accommodating the control circuit device and a connecting member accommodating chamber for accommodating the connecting member, one of the accommodating chambers being isolated from the other accommodating chamber.

7. The motor assembly according to claim 3, wherein the connecting member further includes a bottom portion extending from the downward extension toward the upward extension along the electric path from the motor toward the control circuit device, wherein, the downward extension, the bottom portion and the upward extension are integrally formed.

* * * * *